March 31, 1931.  S. BOOKHEIM  1,798,585
MACHINE FOR DRAWING AND TRIMMING POULTRY
Original Filed Sept. 6 1928    2 Sheets-Sheet 2

INVENTOR.
Sol Bookheim
BY Ernest D. Jansen
ATTORNEY.

Patented Mar. 31, 1931

1,798,585

UNITED STATES PATENT OFFICE

SOL BOOKHEIM, OF ALBANY, NEW YORK, ASSIGNOR, BY DIRECT AND MESNE ASSIGN-
MENTS, TO DRAW-TRIM CORPORATION OF AMERICA, OF ALBANY, NEW YORK, A
CORPORATION

MACHINE FOR DRAWING AND TRIMMING POULTRY

Application filed September 6, 1928, Serial No. 304,341. Renewed November 17, 1930.

My invention consists in a machine that will draw and trim poultry quickly and economically and be simple and inexpensive. It will perform mechanically the several operations, heretofore performed manually, that are required in preparing a bird for cooking, i. e., cutting off its head, also the lower part of the legs, and removing the entrails.

In the drawings, which show the machine operated by foot power,

Figure 1:
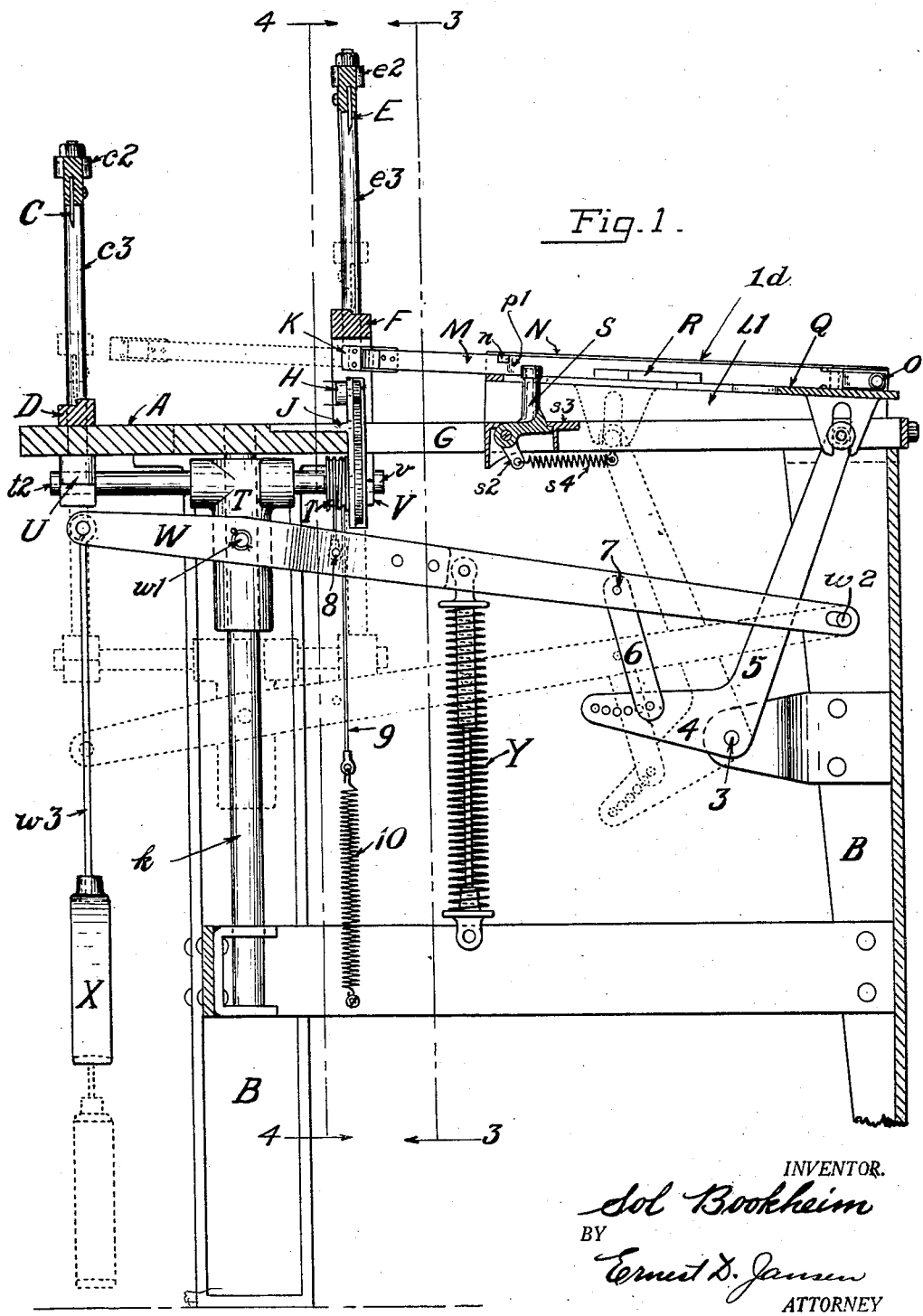
Fig. 1 is a vertical, longitudinal section.
Figure 3:
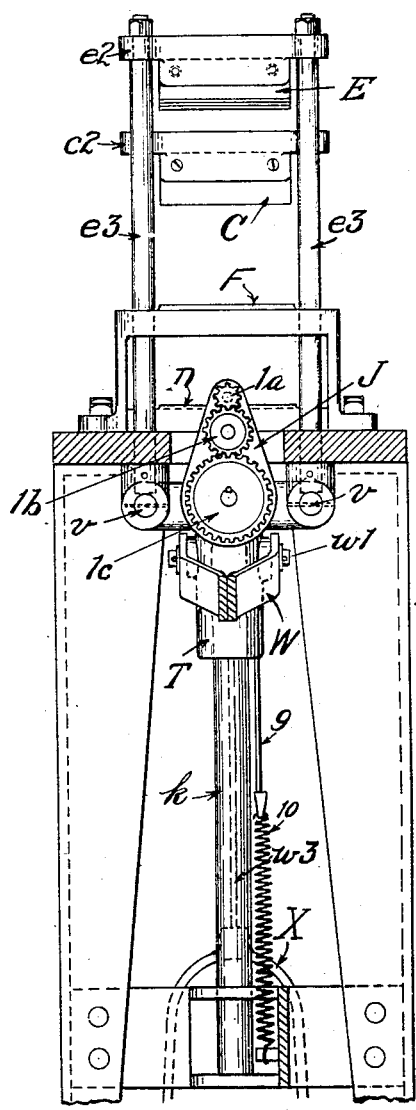
Figure 4:
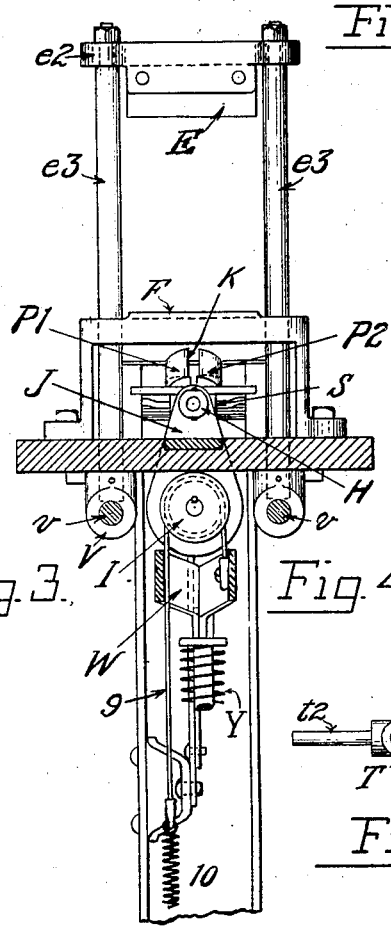
Figure 5:
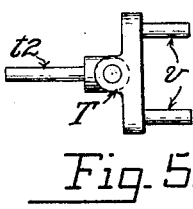

Figs. 3 and 4 are vertical cross-sections taken respectively on lines 3—3 and lines 4—4 of Fig. 1;

Fig. 5 is a detail plan view of the knife-head.

Referring to the drawing, A is the top of a table supported by legs B, B. On this table top at the left-hand end, the bird to be treated is laid, with its neck on a block D, and its legs extending over the higher block F. Above the block D is a transverse knife C parallel to the block and having its cross-bar $c^2$ secured at its ends to the respective upright rods $c^3$, $c^3$. These rods at their lower ends pass down through slots in the table-top A, and also through the respective ends of block D, and are seated in the respective ends of a cross-bar U which is slidable on the horizontal rod $t^2$, that projects horizontally from the crosshead T. By this means the upright rods $c^3$, $c^3$, and knife C may be adjusted nearer to or farther from a similar knife E located above the aforesaid leg block F which bridges over an opening in table-top A as shown in Fig. 3. The knife E is mounted on a cross-bar $e^2$ which is secured at its opposite ends to a pair of upright rods $e^3$, $e^3$, which, like the aforesaid upright rods $c^3$, $c^3$ pass down through the table-top and are seated in a cross-bar V, corresponding to the aforesaid cross-bar U, and mounted on horizontal rods $v$, $v$, which correspond to the aforesaid rod $t^2$ but project oppositely thereto from the cross-head T. Therefore any vertical reciprocation of cross-head T will carry with the cross-head both of the knives C and E together with their vertical rods. Since the neck of the bird lies on block D and its legs rest, at the hock joints, on the block F, the descent of knives C and E will cut off the head of the bird and also those parts of the legs below the hock joints, when the knives reach their respective blocks.

The aforesaid cross-head T slides vertically on an upright post $k$ and is also pivoted at $w^1$ to the operating lever W. Said lever W is pivoted, at $w^2$, by a slotted joint, to the right leg B of the table and is normally held in its upper position by a spring Y. It is worked, in the illustrated machine, by a stirrup X which is connected by a strap $w^3$, to the left end of the lever. A downward pressure of the operator's foot in stirrup X will cause the descent of the knives C and E and the reaction of spring Y will cause their re-ascent to their normal elevated position.

The said lever W causes the operation of a rotary knife H which cuts around the vent of the bird to form an opening therein, the cut-away portion remaining attached to the entrails and removed together therewith as will be hereinafter described. The rotary knife H has, on its shaft, a pinion $1^a$ (see Fig. 3) which meshes by an intermediate gear wheel $1^b$ with the gear wheel $1^c$. The rotary knife H and its operating gears are mounted on a bracket J underneath the cutting-block F. On the shaft of gear $1^c$ is a drum I over which are two turns of a cable 9 which, on one side connects at 8 to the main operating lever W and, on the other side, connects with a spring 10. Thereby the oscillations of lever W will also drive the knife H.

On the right-hand portion of the table top are mounted two parallel guide bars $L^1$ and $L^2$. Between these bars and arranged to slide longitudinally thereon is a carrier plate Q on which the gripping and drawing mechanism is mounted, so as to reciprocate therewith towards and away from the bird on the blocks D and F. The guideways in which plate Q travels along the bars L and $L^1$ may be placed at an angle with respect to the table top as shown in Fig. 1 and the bars themselves may be vertically adjustable. The plate Q and the mechanism thereon may also be covered by a plate N. The carrier Q is reciprocated by means of a bell-crank lever 4—5 pivoted at 3, the arm 4 of that lever being connected by link 6 to the operating bar W at 7. The lower end of link 6 is adjustable on lever 4 to vary the stroke of the carrier Q. The outer end of bell-crank lever 4—5 carries a pin that engages a slot in a projection that extends downward from the under side of carrier Q and through the table top as shown in Fig. 1. In that figure the dotted lines indicate the scope of movement of the power lever W, the cross-head T and the bell-crank lever 4—5. It is the function of the aforesaid plate Q to carry a pair of long prongs $P^1$ and $P^2$ which, as plate Q moves forward, project into the body of the bird to grip the entrails and, on their return stroke, draw them out of the bird and drop them through the opening in the table top. A chute (not shown) may receive them under the table and direct them into a suitable receptacle.

Figure 2:
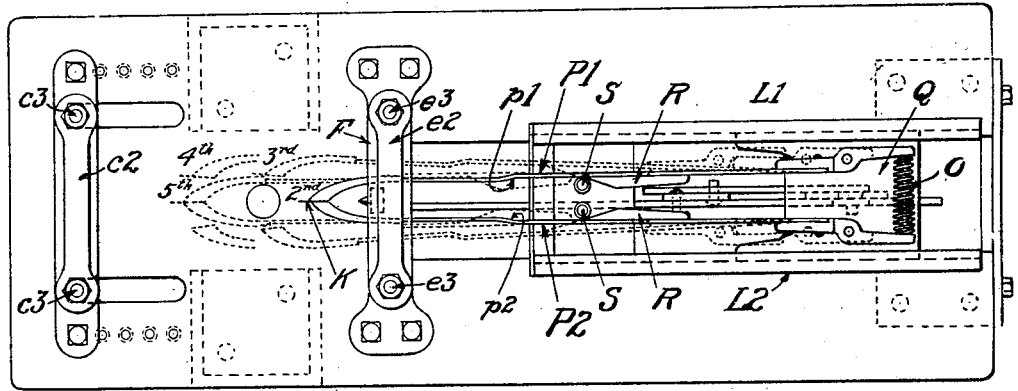
Fig. 2 is a plan view, with the cover plate over the drawing mechanism omitted.

The aforesaid prongs $P^1$ and $P^2$ are, at their rear ends, jointed to carrier H and a spring O tends to hold their outer ends together. As the prongs enter the body of the bird, they are automatically spread apart to embrace and grip the entrails. For that purpose there are two cams R, R secured to the inside of the respective prongs $P^1$, $P^2$. As the prongs move forward these cams ride each along an abutment pin or roller S, which is so mounted, as appears in Fig. 1, that it will yield and be ineffective on the reverse travel of a cam R past it. For this purpose the pin S is pivoted at its lower end to the table top on a transverse axis, but is held upright against a stop $s^3$ by means of a spring $S^4$ acting on the lever arm $s^2$. Therefore the pin S will cause the cams R R to spread the prongs $P^1$ $P^2$ apart on their forward stroke but not on their reverse stroke. Moreover, the prongs are offset inward at the points $p^1$ $p^2$ (see Fig. 2) and just before they come to rest, on their reverse stroke, there offsets $p^1$ $p^2$ engage a projection $n$ on the under side of the cover plate and again spread the prongs apart sufficiently to let them drop the entrails which they have drawn out of the bird. The prongs $P^1$ $P^2$ are, at their outer extremities bent towards each other, as shown in Figs. 2 and 4, and also provided, one or both of them, with a blade K by which they may pierce through the skin of the bird and enter its body. Thus the prongs $P^1$, $P^2$, spreading apart as they enter, to embrace or grip the mass of entrails and, as they are withdrawn, being now relieved of the force of the spreader cams, they draw the entrails with them and finally drop them down through the table top, by the spreading effect of the stop $n$ and offsets $p^1$, $p^2$, just before they come to rest at the end of their backward stroke.

The operation of my machine as a whole may be described as follows:—

A bird to be drawn and trimmed is placed on the table between the knives C and K, its neck lying across the block K and its legs across the elevated block F, and is held toward the rear of the table until the knife H has entered alongside of the vent. The pedal X then being depressed against the tension of the spring Y, the knife H will be rotated and will cut around and free the vent. When the pedal or stirrup X is depressed the mechanism M is also forced forward and as soon as the cams $p^1$ and $p^2$ ride off of the abutment $n$ the prongs close under the urge of the spring O, the prongs retaining the closed position until after they have travelled forward far enough so that the knife K has cut its way into, and the prongs are entered in, the cavity containing the entrails. At this time the cam pins S contact with the inclined surfaces at the forward ends of the cams R and the continued movement forward of the prongs will cause them to be spread apart sufficiently to permit them to pass the gizzard and liver, and to be held apart until they have passed those organs; the pins S will then run out from between the cams R and the spring O will cause the prongs to close in and grip the entrails. In the meantime the knives C and E have severed the neck and windpipe and the legs, and when the pressure forcing down the stirrup is removed the spring Y will return the parts to starting positions, and the prongs which are gripping the entrails will draw them out of the cavity, and as the cams $p^1$ and $p^2$ are again brought into contact with the abutment $n$, and the prongs forced open they will release their grip on the entrails and permit them to drop through the escape opening G.

As a number of variations in the structure illustrated are possible without departing from the spirit of this invention, I do not wish to limit myself to the exact structure shown.

I claim:

1. A machine for drawing poultry comprising a support for the bird and a gripper mounted in reciprocating relation to said support and movable into and out of the bird body.

2. A machine for drawing poultry comprising a support for the bird and a combined gripper and cutter mounted in reciprocating relation to said support and movable into and out of the bird body.

3. A machine for drawing poultry comprising a support for the bird, a gripper formed with two separable members and mounted to move into and out of the bird body, and a spacer acting on said members to change their space relation at points in their route of travel.

4. A machine for drawing poultry comprising a support for the bird, a gripper containing two separable blades mounted in reciprocating relation to said support so as to move into and out of the bird body, and a spacer acting on said blades to change their space relation at points in their route of travel.

5. A machine for drawing poultry comprising a support for the bird, a gripper mounted in reciprocating relation to a bird on said support and having parallel blades, and a spacer cam acting to change the space relation of said blades on their travel route into and out of the bird body.

6. A machine for drawing poultry comprising a support for the bird, a reciprocating gripper having two parallel blades turned towards each other at their outer ends and an automatic spacer for spreading said blades as they enter the bird body.

7. A machine for drawing poultry comprising a support for the bird, a reciprocating gripper having two parallel blades, and an automatic spacer for said blades acting to spread them as they enter the bird body and draw them together before leaving it.

8. A machine for drawing poultry comprising a support for the bird, a reciprocating gripper having separable parts, an automatic spacer for changing the space relation of said parts, and a cutter acting on the bird in advance of the gripper and at a point ahead of it.

9. A machine for trimming and drawing poultry comprising a support for the bird, a transverse cutter at each end of said support, a longitudinal cutter and gripper extending outside of said support, and a common operating mechanism for the said cutters.

10. In a machine for drawing poultry: means for cutting an opening into the interior of a bird and freeing the vent from the surrounding tissue, entrails gripping and drawing mechanism, means for causing reciprocating movement of said mechanism whereby same will first enter the bird and then be withdrawn, means for causing said mechanism to open at a point in its forward travel, and a means for causing said mechanism to close near the end of its forward travel and to normally stay closed during the major part of its backward travel.

11. In a machine for drawing poultry: means for cutting the vent free from the surrounding tissue, entrails gripping and drawing mechanism, means for causing reciprocating movement of said mechanism, means for causing said mechanism to open at a point in its forward travel, means for causig said mechanism to close as it nears the end of its forward travel and to stay closed during the major part of its backward travel, and means for causing said mechanism to open as it nears the end of its backward travel.

12. In a machine for drawing poultry: means for cutting the vent free from the surrounding tissue, entrails gripping and drawing mechanism, means for causing reciprocating movement of said mechanism, means for causing said mechanism to open at a predetermined point in its forward travel and to be held open until near the end thereof, and means for causing said mechanism to then close and stay closed for a major part of its backward travel.

13. In a machine for drawing poultry: means for cutting the vent free from the surrounding tissue, entrails gripping and drawing mechanism, means for causing reciprocating movement of said mechanism, means for causing said mechanism to open at a predetermined point in its forward travel and to be held open until it reaches a second predetermined point, means for causing said mechanism to close after it passes said second point and to be held closed until it has completed the major part of its backward travel, and means for again opening said mechanism as it nears the end of said backward travel.

14. In a machine for drawing and trimming poultry: means for cutting the vent free from the surrounding tissue and thereby forming an opening into the interior of the bird, entrails gripping and drawing mechanism, a cutting member mounted on said mechanism, means for causing reciprocating movement of said mechanism, means for causing said mechanism to open at a predetermined point in its forward travel and to be held open until it reaches a second predetermined point, means for causing said mechanism to then close and stay closed until it has completed the major part of its backward travel.

15. In a machine for drawing and trimming poultry: means for cutting the vent free from the surrounding tissue, entrails gripping and drawing mechanism, means for causing reciprocating movement of said mechanism, means for causing said mechanism to open at a predetermined point in its forward travel and to be held open until it reaches a second predetermined point, means for causing said mechanism to close after it passes said second point and to be held closed until it has completed the major part of its backward travel, means for again opening the mechanism as it nears the end of said backward travel, and means for cutting through the neck.

16. In a machine for drawing and trimming poultry: means for cutting the vent free from the surrounding tissue, entrails gripping and drawing mechanism, means for causing reciprocation movement of said mechanism, means for causing said mechanism to open at a predetermined point in its forward travel and to be held open until it reaches a second predetermined point, means for causing said mechanism to close after it passes said second point and to be held closed until it has completed the major part of its backward travel, means for again opening said mechanism as it nears the end of said backward travel, means for cutting through the neck, and means for cutting through the legs.

In testimony whereof I have affixed my signature.

SOL BOOKHEIM.